May 21, 1946. W. J. ROBERTS 2,400,600
ANTIROOTER
Filed Jan. 8, 1945
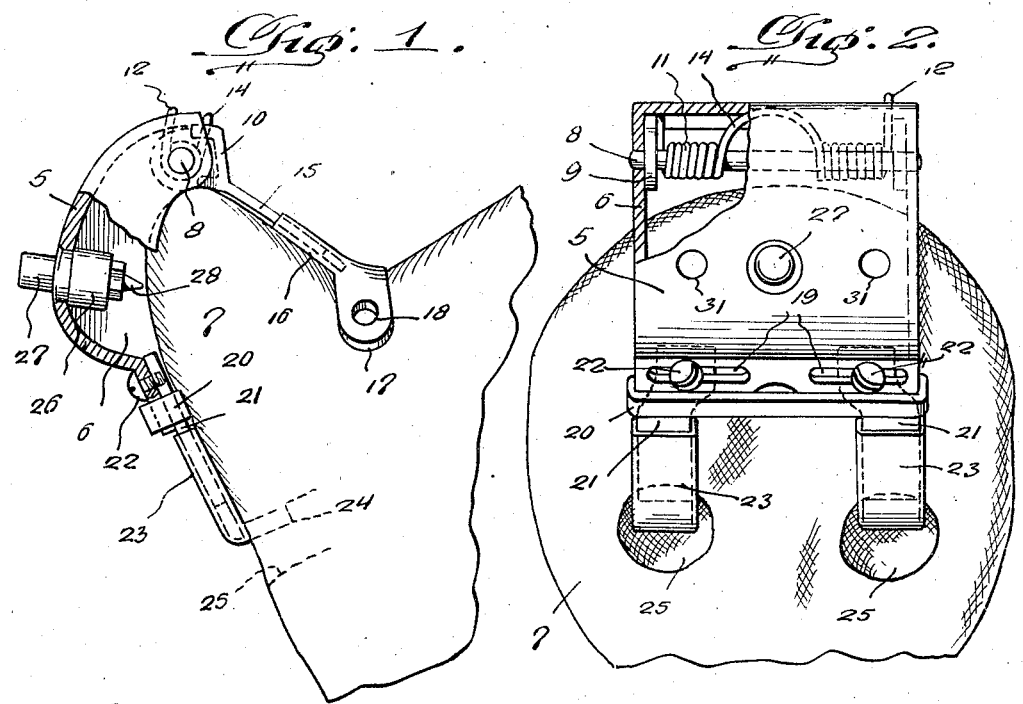
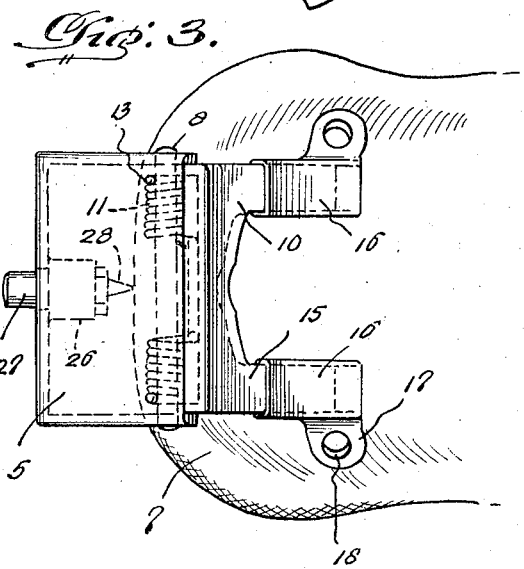
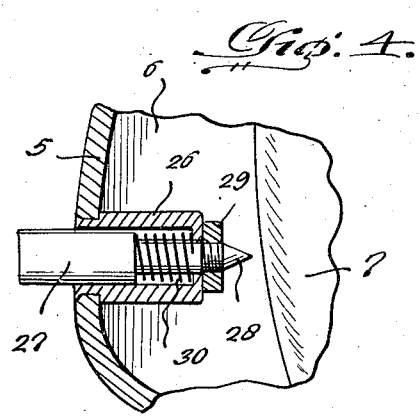
Inventor
Wesley J. Roberts,
Attorneys Patented May 21, 1946

2,400,600

UNITED STATES PATENT OFFICE 2,400,600

ANTIROOTER

Wesley J. Roberts, Jacksonville, Ark.

Application January 8, 1945, Serial No. 571,791

7 Claims. (Cl. 119—135)

The present invention relates to new and useful improvements in anti-rooters adapted for applying to the snout of hogs and embodying means to effectively prevent the animal from rooting in the ground.

More specifically, the invention embodies a clamping member adapted for attaching to the snout of the hog and embodying a movable barbed element or prong adapted to prick the snout of the animal when it attempts to root, thereby causing the animal to desist in such practice.

An important object of the present invention is to provide clamping means for securing the device in position on the snout of the hog without causing injury thereto or to disfigure the animal for show stock purposes.

A further object of the invention is to provide a clamping means for the device which is adjustable for fitting snouts of various sizes.

A still further object is to provide a device of this character of simple and practical construction, which is efficient and reliable in operation, relatively inexpensive to manufacture, easy to install in position and remove from the snout of the animal and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a fragmentary side elevational view of the snout of a hog showing the anti-rooter in position thereon and with parts broken away and shown in section.

Figure 2 is a front elevational view with parts broken away and shown in section.

Figure 3 is a top plan view, and

Figure 4 is an enlarged fragmentary sectional view through the guide or housing for the prong.

Referring now to the drawing in detail wherein for the purpose of illustration I have disclosed a preferred embodiment of the invention, the numeral 5 designates a rounded plate having inwardly projecting flanges 6 at its side edges and curved to fit over the top and front surface of the snout 7 of a hog to space the plate outwardly therefrom as will be apparent from an inspection of Figure 1 of the drawing.

A pin 8 has its opposite ends supported in the side flanges 6 to extend transversely at the upper portion of the plate and on which is pivotally mounted a pair of ears 9 formed at one end of a clamping plate 10 which overlies the top of the snout.

A coil spring 11 is mounted on the pin 8 with its end 12 projecting upwardly through openings 13 in the upper portion of the plate and with the intermediate portion of the spring curved to form a loop 14 adapted to bear against the pivoted edge of the plate 10 to yieldably urge the free edge of the plate 10 downwardly on top of the snout 7.

The free edge of the plate 10 is formed with a pair of spaced parallel legs 15 slidably received in sockets 16, the outer ends of the sockets being formed with laterally extending curved plates 17 adapted to bear against the top of the snout. The plates 17 are formed with ventilating openings 18.

The plate 5, adjacent its lower edge, is formed with a pair of horizontal slots 19 adjacent to which is a guide band 20 which may be either formed integrally with the plate or suitably attached thereto, the back of the band being spaced from the rear surface of the lower edge of the plate 5 to slidably receive a pair of spaced parallel legs 21 having their upper ends adjustably attached to the plate 5 by means of screws 22 inserted through the slots 19.

The lower ends of the legs 20 are slidably received in sockets 23 having inwardly extending lugs 24 adapted for insertion in the nostrils 25 of the snout.

A cylindrical guide or housing 26 is carried by the plate 5 adjacent its central portion and projects inwardly thereof, the outer end of the guide being open and having a plunger 27 slidably mounted therein, the inner end of the plunger having a prong 28 slidably projecting through the inner end of the guide 26 and having a nut 29 threaded thereon bearing against the inner end of the guide. A coil spring 30 is mounted on the plunger to yieldably project the plunger outwardly beyond the surface of the plate 5, and with the prong 28 spaced slightly from the front surface of the animal's snout 7 as will be apparent from an inspection of Figure 4 of the drawing.

The plate 5 may also be formed with one or more ventilating openings 31.

In the operation of the device, the sockets 23 and legs 21 are adjusted horizontally as well as vertically to properly fit within the nostrils 25 of the animal's snout and with the edges of the flanges 6 seated on the top of the snout and with the legs 15 of the upper plate 10 and their adjustable extensions or sockets 16 clamped against the top of the snout by means of the spring 11.

The device will thus be held firmly in position on the upper edge of the snout of the animal and when the animal attempts to root in the ground, or comes into contact with a fence or other object the plunger 27 will be moved inwardly causing the prong 28 to prick the animal thereby causing it to desist its rooting action.

Since the attaching means for the device does not necessitate penetration into the hide or skin of the animal there is no disfigurement caused by the attaching of the device in position. This is of particular benefit when used upon show stock which frequently becomes disfigured through the use of anti-rooting devices which embody attaching means necessitating a penetration of the hide or skin of the animal.

It will be understood that the device may be constructed of any suitable material, such as light weight metal, plastic or the like.

It is believed that the details of construction, manner of operation and advantages of the device will be readily understood from the foregoing without further detailed explanation.

Having thus described the invention, what I claim is:

1. An anti-rooting device for hogs comprising a member adapted for fitting over the upper edge of the snout of a hog, a spring projected prong carried by said member, a spring biased clamping member at the upper edge of said first member overlying the top of the snout, and means at the lower edge of said first member adapted for retention in the nostrils of the snout.

2. An anti-rooting device for hogs comprising a member adapted for fitting over the upper edge of the snout of a hog, a spring projected prong carried by said member, a spring biased clamping member at the upper edge of said first member overlying the top of the snout, and means adjustably carried at the lower edge of said first member adapted for retention in the nostrils of the snout.

3. An anti-rooting device for hogs comprising a member adapted for fitting over the upper edge of the snout of a hog, a spring projected prong carried by said member, a spring biased clamping member at the upper edge of said first member overlying the top of the snout, and horizontally and vertically adjustable means carried at the lower edge of said first member for retention in the nostrils of the snout.

4. An anti-rooting device for hogs comprising a member adapted for fitting over the upper edge of the snout of a hog, a spring projected prong carried by said member, a spring biased clamping member at the upper edge of said first member overlying the top of the snout, and horizontally and vertically adjustable extensions carried at the lower edge of said first member adapted for retention in the nostrils of the snout.

5. An anti-rooting device for hogs comprising a member adapted for fitting over the upper edge of the snout of a hog, a spring projected prong carried by said member, a spring biased clamping member at the upper edge of said first member overlying the top of the snout, and means adjustably carried at the lower edge of said first member adapted for retention in the nostrils of the snout, said clamping member and said adjustable means including adjustable extensions.

6. An anti-rooting device for hogs comprising a plate having inwardly projecting side flanges adapted to bear against the front of the snout of a hog to space the plate therefrom, a spring projected prong carried by the plate adapted to prick the hog upon engaging an object, a pivoted clamping plate at the upper edge of said first plate, spring means urging the clamping plate against the top of the snout, a pair of spaced parallel legs on said clamping plate, a pair of spaced parallel legs carried at the lower edge of the first plate, and means carried by said last-named legs adapted for engagement in the nostrils of the snout.

7. An anti-rooting device for hogs comprising a plate having inwardly projecting side flanges adapted to bear against the front of the snout of a hog to space the plate therefrom, a spring projected prong carried by the plate adapted to prick the hog upon engaging an object, a pivoted clamping plate at the upper edge of said first plate, spring means urging the clamping plate against the top of the snout, a pair of spaced parallel legs on said clamping plate, extensions slidably carried by said legs having transversely curved outer ends to conform to the curvature of the top of the snout, a pair of spaced parallel legs at the lower edge of the first plate, means for adjustably securing the last-named legs horizontally to the first plate, extensions slidably carried by the last legs, and inwardly projecting lugs on said extensions adapted for insertion in the nostrils of the snout.

WESLEY J. ROBERTS.